(12) United States Patent
Janssen

(10) Patent No.: US 7,190,306 B2
(45) Date of Patent: Mar. 13, 2007

(54) METHOD AND SYSTEM FOR DETECTING WITH RADAR THE PASSAGE BY A VEHICLE OF A POINT FOR MONITORING ON A ROAD

(75) Inventor: Theodorus Maria Janssen, Spaarndam (NL)

(73) Assignee: Gatsometer B.V., Haarlem (NL)

( * ) Notice: Subject to any disclaimer, the term of this patent is extended or adjusted under 35 U.S.C. 154(b) by 0 days.

(21) Appl. No.: 11/061,304

(22) Filed: Feb. 18, 2005

(65) Prior Publication Data
US 2006/0066472 A1    Mar. 30, 2006

(30) Foreign Application Priority Data
Sep. 10, 2004    (NL) .................................... 1027018

(51) Int. Cl.
| | | |
|---|---|---|
| *G01S 13/91* | (2006.01) | |
| *G01S 13/58* | (2006.01) | |
| *G01S 13/62* | (2006.01) | |
| *G01S 13/92* | (2006.01) | |
| *G01S 13/00* | (2006.01) | |
| *G01S 13/04* | (2006.01) | |
| *G01S 13/88* | (2006.01) | |

(52) U.S. Cl. .................. 342/118; 342/27; 342/28; 342/61; 342/66; 342/104; 342/105; 342/107; 342/109; 342/113; 342/114; 342/128; 342/133; 342/134; 342/135; 342/139; 342/146; 342/147; 342/175; 342/195

(58) Field of Classification Search ........ 340/933–943; 342/27, 28, 52–61, 66, 69–72, 104, 105–115, 342/118, 175, 176, 179, 195, 128–147
See application file for complete search history.

(56) References Cited

U.S. PATENT DOCUMENTS

| | | | | |
|---|---|---|---|---|
| 2,620,470 A | * | 12/1952 | Rather, Jr. et al. | 342/69 |
| 2,785,395 A | * | 3/1957 | Platzman | 342/66 |
| 3,268,863 A | * | 8/1966 | Odion et al. | 340/933 |
| 5,170,162 A | * | 12/1992 | Fredericks | 340/935 |
| 5,266,954 A | * | 11/1993 | Orlowski et al. | 342/69 |
| 5,339,081 A | * | 8/1994 | Jefferis et al. | 342/28 |
| 6,232,911 B1 | | 5/2001 | O'Conner | |

FOREIGN PATENT DOCUMENTS

| | | |
|---|---|---|
| EP | 0350751 | 1/1990 |
| EP | 0616232 | 9/1994 |
| EP | 0636900 | 2/1995 |
| EP | 0730166 | 9/1996 |
| EP | 0335009 | 10/1999 |
| NL | 9300672 | 11/1994 |

* cited by examiner

*Primary Examiner*—Bernarr E. Gregory
(74) *Attorney, Agent, or Firm*—Morgan Lewis & Bockius LLP; Richard F. Trecartin; Victor E. Johnson

(57) ABSTRACT

The invention relates to a method for detecting the passage by a vehicle of a determined point for monitoring on a road, wherein from a remotely situated location a radar beam is transmitted continuously to the point for monitoring, reflections from the transmitted radar beam are received at the remotely situated location, and it is determined from the received reflections that the vehicle is passing the point for monitoring. The radar beam can herein be transmitted at an acute angle to the travel direction of the passing vehicle. The detection can be used to activate a red-light camera, to measure the speed of the vehicle or measure the traffic intensity, without sensors, for instance induction loops, having to be arranged in the road for this purpose.

24 Claims, 3 Drawing Sheets

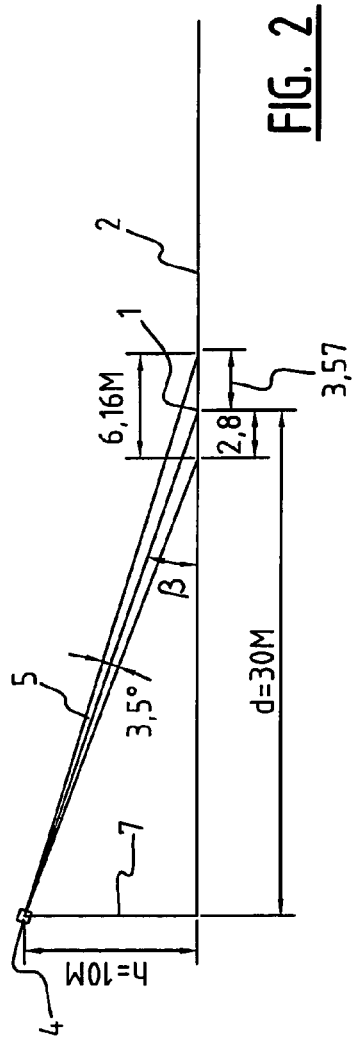

METHOD AND SYSTEM FOR DETECTING WITH RADAR THE PASSAGE BY A VEHICLE OF A POINT FOR MONITORING ON A ROAD

CROSS REFERENCE TO RELATED APPLICATIONS

This application claims priority to Dutch Patent Application Number 1027018 filed Sep. 10, 2004.

TECHNICAL FIELD

The invention relates to a method for detecting the passage by a vehicle of a determined point for monitoring on a road. Such a method is generally known, and is used for instance in establishing traffic violations such as driving through a red light, or in measurements of traffic density, for instance for the purpose of guiding traffic in order to enhance traffic flow.

BACKGROUND OF THE INVENTION

In most known methods use is made of sensors which are mounted in or on the road surface. A classic example are air-filled conduits laid over the road surface which record a pressure difference when the wheels of a vehicle drive over them. Loads on the road surface by passing vehicles can also be detected using piezoelectric elements embedded in the road surface. Most widely used however are inductive detections. Here the change is measured in the amperage in a loop-like conductor in the road surface which results from the change in the electromagnetic field when a vehicle—largely consisting of metal—passes by.

The drawback which all said methods have in common is that they require modifications to the road surface at the location to be monitored, for instance a stop line at a traffic light. Cutting operations are generally required for this purpose, whereby the road must be closed for a time. This is increasingly less acceptable as the amount of traffic increases, all the more so because it is usually precisely at the busiest points in the road network that the detectors are required. Furthermore, the number of sensors which can be accommodated at a given location in the road surface is limited, since there must be sufficient space between them so that they do not affect each other's operation. It is mainly at busy intersections that large numbers of sensors, particularly induction loops, are often found in the road surface. In addition to loops which must detect driving through a red light, there are often also loops which respond to the presence of a vehicle at a intersection which is otherwise empty in order to set the traffic light to green, and loops which respond to the presence of vehicles which have priority, such as buses, emergency service vehicles and the like.

SUMMARY OF THE INVENTION

The invention therefore has for its object to provide a method of the above described type wherein this drawback does not occur. According to the invention this is achieved in such a method in that from a remotely situated location at least one radar beam is transmitted substantially continuously to the point for monitoring, reflections from the at least one transmitted radar beam are received at the remotely situated location, and it is determined from the received reflections that the vehicle is passing the point for monitoring. By making use for the detection of radar waves which can be transmitted and received at a location which can be situated quite a distance from the point for monitoring, it is possible to dispense with the arranging of sensors on or in the road surface.

The at least one radar beam is preferably transmitted at an acute angle to the travel direction of the passing vehicle, so that the transmitting and receiving location can indeed be chosen at a considerable distance from the point for monitoring.

Passing of the point for monitoring can be determined in simple manner by calculating from the received reflections the distance of the vehicle from the transmitting and receiving location and comparing the thus calculated distance to the known distance between the transmitting and receiving location and the point for monitoring.

In order to prevent incorrect detections as a result of for instance noise or birds passing through the radar beam, a series of values for the distance of the vehicle is preferably calculated from a number of successively received reflections, and a detection of the vehicle passing the point for monitoring is only valid if this series of distance values corresponds precisely.

An activating signal is advantageously generated when a vehicle passes the point for monitoring in a determined direction. Action can thus be taken on the basis of the detection in respect of for instance establishing a violation, or in order to guide the traffic flow in the chosen direction past the point for monitoring. It is advantageous in this respect when an identification of the transmitting and receiving location is linked to the activating signal, so as to establish unambiguously where the vehicle passed. If the detection is used as part of law enforcement, for instance at a traffic light, at least one picture record of the passing vehicle is preferably made on the basis of the activating signal.

If the speed and the travel direction of the passing vehicle is also calculated from the received reflections, the detection can also be used to establish a violation of the maximum speed applying at the location. The speed may also be important when the detection is used to guide the traffic flow at the point for monitoring.

In this case also a series of values for the speed of the vehicle is preferably calculated from a number of successively received reflections, and a speed calculation is valid only when the series of speed values corresponds precisely. Incorrect detections are hereby as it were filtered out, which is particularly important when the calculated speed is being used to establish a violation.

In order to be able to take action on the basis of the speed measurement, the calculated speed is advantageously linked to the activating signal.

So as to ensure that each detection does indeed relate to only a single vehicle, the distance between the transmitting and receiving location and the point for monitoring on the one hand and the characteristic of the at least one transmitted radar beam on the other are preferably matched such that the dimension of the radar beam at the point for monitoring is of the same order of magnitude as the width of a vehicle. This prevents a plurality of vehicles being caught in the same radar beam, which could result in incorrect detection and possibly undeserved fines. This can be achieved when the distance amounts to several tens of meters and the radar beam has a beam width of several degrees.

When the road comprises a number of lanes, on each of which a specific point is to be monitored, it is recommended that for each lane a radar beam is transmitted at a related angle from the transmitting and receiving location. A plurality of lanes can thus be monitored from a single transmitting and receiving location, which results in savings in the cost of equipment and simplification of placing.

The invention also relates to a system for performing the above described method. Such a system for detecting the passage by a vehicle of a determined point for monitoring on a road is provided according to the present invention with a device disposed at a remote location for transmitting at least one radar beam substantially continuously to the point for monitoring, receiving reflections from the at least one transmitted radar beam, and determining from the received reflections that a vehicle is passing the point for monitoring.

Preferred embodiments of the system according to the invention are described in the sub-claims 15 to 26.

BRIEF DESCRIPTION OF THE DRAWINGS

The invention is now elucidated on the basis of two exemplary embodiments, wherein reference is made to the accompanying drawing, in which:

FIG. 2 is a side view of a radar beam transmitted by the detection system of FIG. 1, FIG. 3 shows schematically the structure of an activating signal generated by the detection system, FIG. 4 shows schematically the structure of a word of the activating signal of FIG. 3, FIG. 5 shows schematically the structure of a query signal sent to the detection system and a reply signal generated by the detection system.

DETAILED DESCRIPTION OF THE INVENTION

Figure 1:
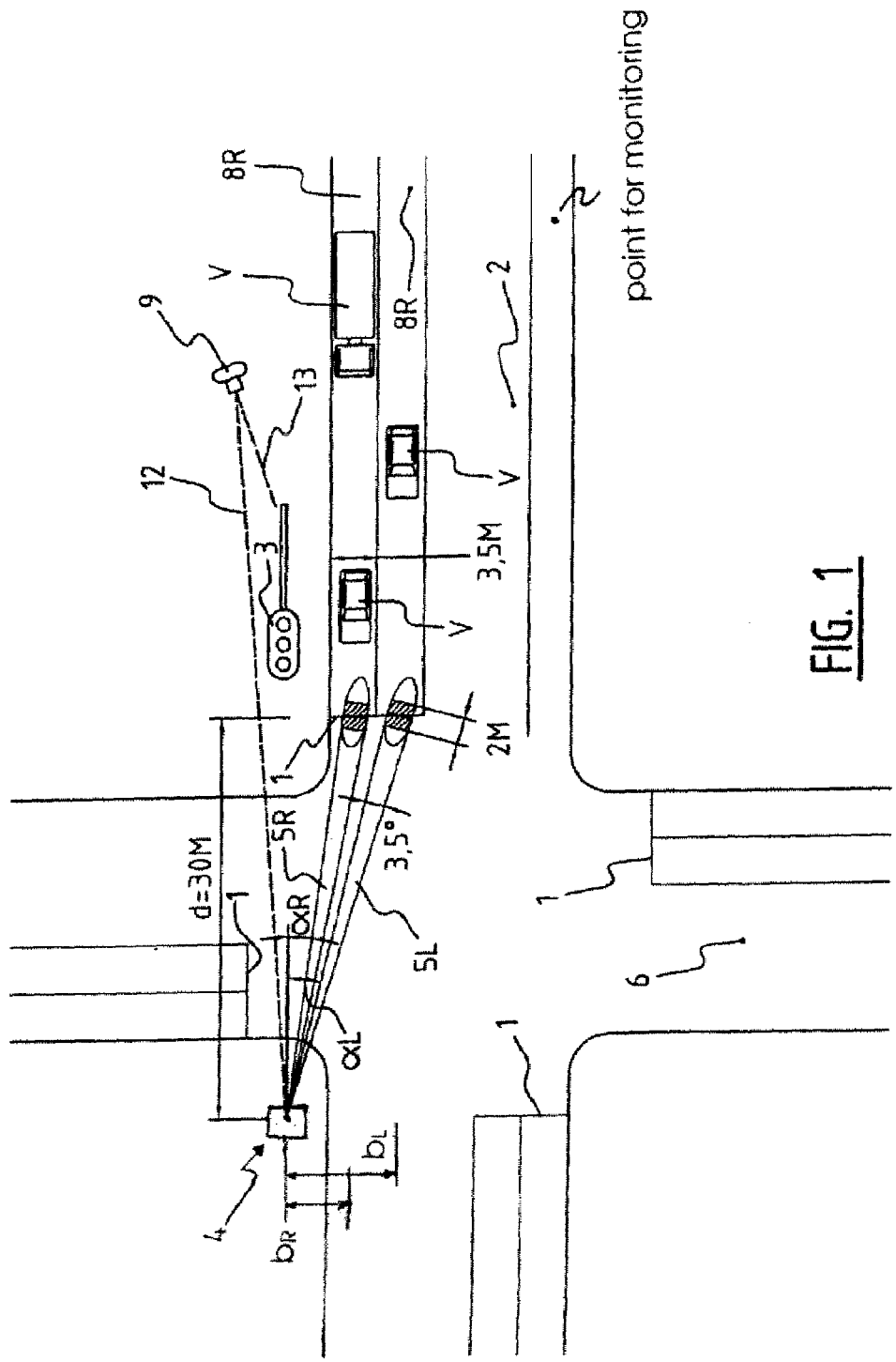
FIG. 1 is a schematic top view of a road with a point for monitoring thereon, in this case a stop line at an intersection protected with traffic lights, and a detection system according to a first embodiment of the invention.

The invention relates to a system for detecting passing of a determined point for monitoring 1 on a road 2, in this case a stop line at an intersection of the road and another road 3, which intersection is protected with traffic lights 3 (FIG. 1). This detection system comprises a device 4 for transmitting a radar beam 5 to the point for monitoring 1, and receiving reflections of the radar radiation generated by passing vehicles V. The transmitting and receiving device 4, which is disposed at a location remote from stop line 1, here on the other side of the intersection, is further adapted to determine from the received reflections that a vehicle V is passing stop line 1. The transmitting and receiving device or radar device 4 transmits at a frequency of about 24 Ghz and a power of 20 dBm (EIRP).

Only a single traffic light 3 with associated detection system is drawn here, but it will be apparent that four such traffic lights and detection systems are installed at the intersection.

In the shown embodiment the road 2 on which the stop line 1 is drawn has a left and right-hand lane 8L, 8R. Radar device 4 is therefore adapted to transmit two radar beams 5L, 5R which have a differing orientation such that they each define a search field S around the stop line in one of the lanes 8L, 8R.

Figure 6:
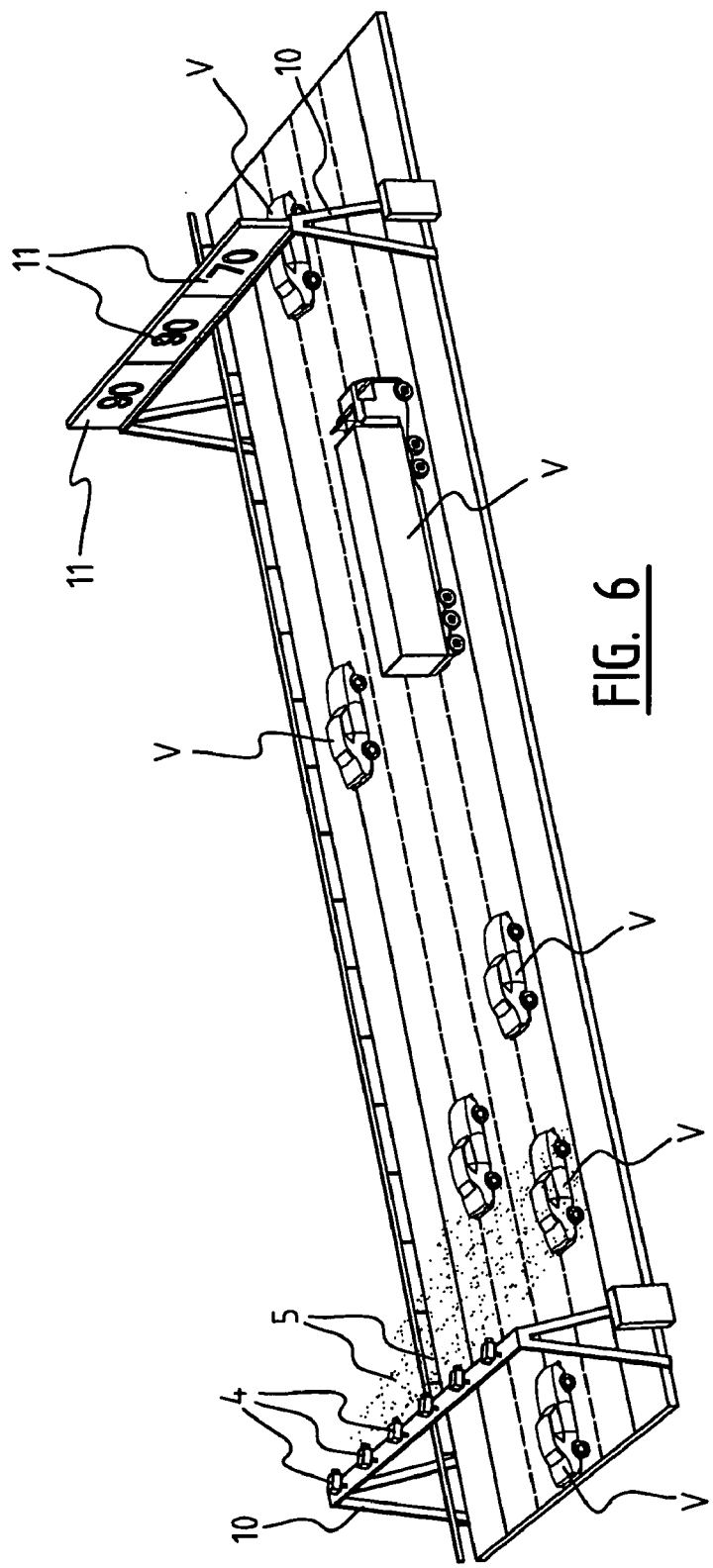
FIG. 6 shows a perspective view of the arrangement of the detection system for use in traffic flow management.

In the shown embodiment radar device 4 is disposed adjacently of road 2, and radar beams 5L, 5R are each transmitted—as seen in the horizontal plane—at an acute angle $\alpha_L$, $\alpha_R$ to the travel direction of the passing vehicles V. It is thus possible to dispense with placing of portals for radar device 4 above road 2, which often meets with practical objections. If however a portal 10 were to be placed (FIG. 6), a separate radar device could be suspended above each lane 8L, 8R, the radar beam 5L, 5R from which could then be transmitted straight forward.

In order to prevent the transmitted radar beams 5L, 5R being reflected by traffic on the intersecting road 6 before they reach stop line 1, radar device 4 is placed on an elevation, here a pole 7 (FIG. 2). As seen in the vertical plane, radar beams 5L, 5R are thus also transmitted at an acute angle $\beta$ to the travel direction.

The resulting solid angle Y between the transmitted radar beams 5L, 5R and the travel direction is therefore also acute. In the case that the speed of passing vehicles V is also being determined from the reflected radar beams, as discussed below, this must be corrected for the angle at which radar beams 5L, 5R are transmitted.

The values of the different angles are given by the relations:

$\alpha = \mathrm{arc\,tan}\; b/d,$ $\beta = \mathrm{arc\,tan}\; h/\sqrt{(b^2+d^2)},$ and $\gamma = \mathrm{arc\,cos}\; d/\sqrt{(b^2+d^2+h^2)},$ in which:

b is the distance between the position of pole 7 and the point for monitoring 1 in the relevant lane 8L, 8R measured transversely of the travel direction, d is the distance between pole 7 and the (extension of) stop line 1 measured in the travel direction, and h is the height of pole 7.

In the shown embodiment the distances b and d and the height h are chosen such that the angles $\alpha$, $\beta$, and $\gamma$ can be set to between about 10° and 45°.

Radar device 4 is adapted to detect stop line 1 being passed by calculating from the received reflections the distance of the vehicle from the device and by comparing the thus calculated distance to the known distance $\sqrt{(b^2+d^2+h^2)}$ of radar device 4 from the stop line 1. In order to prevent for instance electronic noise in device 4 or an incident such as birds flying through radar beams 5L, 5R resulting in incorrect detections, radar device 4 calculates a series of values for the distance of vehicle V from a number of successively received reflections. In the shown embodiment ten values are calculated, making use of reflections being received in each case for 10 milliseconds. A detection that a vehicle V is passing stop line 1 is then assumed to be valid only if these ten distance values correspond to each other within determined limits. In the shown embodiment the standard deviation $\sigma$ of the ten distance values is calculated, and the detection is only accepted if this standard deviation is less than about half a vehicle length ($\sigma<2.2$ m).

The detection begins when a vehicle V drives into a search field S covered by one of the radar beams 5L, 5R. The length of this search field S is entered by means of a configuration telegram to be discussed below into the control electronics of radar device 4 prior to the first use of the detection system, and can optionally be modified during operation of the system. Search field S is defined by a lower limit $S_L$ and an upper limit $S_U$. The values of these lower and upper limit $S_L$, $S_U$ are chosen such that a vehicle V in the relevant radar beam 5 can be followed for some time. The maximum length of the search field, thus the distance between $S_L$ and $S_U$, is of course determined by the horizontal and vertical distance from radar device 4 and the vertex of radar beam 5. With normal values of these two quantities, this length will amount to a few meters (FIG. 2).

When a vehicle V passes stop line 1, an activating signal T (FIG. 3) is generated by radar device 4. This signal T, which forms part of an object telegram to be discussed below, is used to activate an external system coupled to the detection system. The activating signal can for instance be fed to a counter of a traffic control system (FIG. 6) which calculates an optimum speed on the basis of the number of passing vehicles V per unit of time, and displays this speed on display boards 11 above or along the road.

In order to be able to establish unambiguously the point at which a vehicle V has passed, particularly in respect of furnishing proof when the detection is used in the context of law enforcement, the object telegram transmitted by radar device 4 also contains, in addition to activating signal T, the identification of this radar device 4.

In the shown embodiment the detection system comprises a device 9 connected controllably to radar device 4 for making at least one picture record of the passing vehicle. The system can thus be used as red-light camera (RLC) system. The recording device 9 can be a conventional photo camera with film roll, but in connection with capacity and speed of processing, it is recommended to make use of a digital camera. This can have its own storage medium, but can in addition or instead be connected via a communication network to a central office.

In addition to receiving activating signal T, which indicates that a vehicle V is passing stop line 1, recording device 9 also receives in each case a signal from traffic light 3 when it is at red. If these two signals are provided simultaneously, this is an indication that a vehicle V is driving through red onto the intersection, and one or more picture records are made. On the basis of these picture records, in which in addition to vehicle V and red traffic light 3 all manner of additional information can be displayed, vehicle V can be identified, so that the holder of the vehicle registration can be sent a fine.

To enable optimal use of the presence of a detection system at the point being monitored thereby, radar device 4 is further adapted in the shown embodiment to calculate the speed of the passing vehicle V from the received reflections. The detection system can thus be used not only as RLC system, but also as speed camera system. Just as in the calculation of the distance between vehicle V and radar device 4, for the speed measurement a series of values for the speed of vehicle V is also calculated from a number of successively received reflections, and the calculated speed is assumed to be valid only when the series of speed values corresponds precisely. Ten values can once again be calculated, of which the standard deviation a must be smaller than a determined value, for instance about 5 km/h ($\sigma \leq 1.4$ m/s), so roughly ten percent of the maximum speed usually applying at the location of traffic lights.

In order to ensure a reliable detection, it is important that only one vehicle V at a time can be detected. Radar device 4 is therefore disposed at a distance from stop line 1 and adapted to transmit a radar beam 5 such that the dimension of radar beam 5 at the position of stop line 1 is of the same order of magnitude as the width of a vehicle V. In the shown embodiment the distance between radar device 4 and stop line 1 is several tens of meters, while radar beams 5L, 5R each have a beam width of several degrees, more particularly 3.5°±1.75°.

The communication between recording device 9, traffic light 3 and radar device 4 proceeds via lines 12, 13 along and under road 2. Because red-light cameras are usually used in combination with induction loops, for communication between radar device 4 and recording device 9 compatibility is preferably sought with the standards developed for this purpose. The interface between radar device 4 and recording device 9 can thus be a 9-pin female sub D connector, the pins of which are used as follows:

| Connection | Pin number |
|---|---|
| +12 V | 1 |
| GND | 3 |
| Alarm pin A (RS485 level) | 5 |
| Alarm pin B (RS485 level) | 4 |
| RS485 (RS422) pin A-input | 7 |
| RS485 (RS422) pin B-input | 6 |
| RS485 (RS422) pin A-output | 9 |
| RS485 (RS422) pin B-output | 8 |
| Not connected | 2 |

The interface thus comprises the feed of the supply voltage, two RS422 outputs and an RS422 input. One of the RS422 outputs and the RS422 input serve for the data transfer. The second RS422 output, the alarm output, serves only to transmit a status or activating signal.

This alarm output is configured as RS422 output so as to be compatible with the RS422 input on the side of recording device 9. The alarm output ultimately generates the signal which activates recording device 9 in order to make a record of a vehicle V which passes stop line 1 when traffic light 3 is at red. The logic levels of this signal are:

no alarm—A high, B low, alarm—A low, B high, wherein high and low are respectively +5V and 0V.

Used for data transfer between radar device 4 and recording device 9 are, as stated, an RS422 input and an RS422 output which operate in accordance with the specification: 19200, 8, N, 1. The data transfer takes place in the form of so-called telegrams, three types of which can be distinguished. An "object" telegram is the standard output telegram of radar device 4 which is sent every ten milliseconds and contains data such as the distance and speed of the detected object, the signal level and status information. A "configuration" telegram is a telegram which is sent to radar device 4 for configuration thereof. In response to such a configuration telegram, radar device 4 sends a "reply" telegram.

Each telegram has a similar structure. It consists of words of in each case 16 bits, so 2 bytes, a lower byte followed by a higher byte (FIG. 4). Each telegram begins with a synchronization word specifying the type of telegram. A second word indicates the length of the telegram, i.e. the number of words from the following word to the end of the telegram. There then follow words with the actual data which must be transferred, closed by a CRC-word forming the end of the telegram. This CRC-(cyclic redundancy check) word is the 16 bits sum of all values from the word indicating the number of words, so here the second word, up to and including the word immediately before the CRC-word. Remainders are not included in this sum.

As stated, the object telegram (FIG. 3) is presented every ten milliseconds, irrespective of whether there is a vehicle V in radar beam 5. It contains data concerning the detected object and the identification for radar device 4. The total transfer time of the object telegram, which in the shown embodiment runs to nine words, amounts to 9.4 milliseconds at a transfer speed of 19200 bps. The structure of the object telegram is as follows:

| Word number | Content |
|---|---|
| 1 | 81h (lower byte), 75h (higher byte) |
| 2 | Length (format: integer without sign) (here 7) |
| 3 | Speed of the object in cm/s (format: integer with sign, running from −16383 to +16383) |
| 4 | Distance to the object in cm (format: integer with sign) |
| 5 | Signal amplitude of the object in dB (format: integer without sign) |
| 6 | Status |
| 7 | Identification of equipment |
| 8 | Version number of software |
| 9 | CRC |

By displaying the speed in cm/s and the distance in cm a good compromise is reached between accuracy on the one hand and the measuring range on the other. The values given in the telegram for the speed and distance are otherwise not the raw momentary values, but the progressive mean over the previous 100 milliseconds (or ten detections). These values imply a prediction for the coming ten milliseconds.

As stated, the object telegram is also presented if no object or vehicle V is to be found in radar beam 5, and the measurement values therefore form only noise. Whether or not a vehicle V is situated in radar beam 5 is indicated by bit 0 of the lower byte of the status word, the alarm bit (1=alarm, 0=no alarm). This bit is activated if a vehicle V passes stop line 1 and deactivated again when vehicle V leaves search field S. The alarm status is also presented to the alarm pins of the connector.

The identification of radar device 4 which is co-transmitted in the object telegram consists of two parts, an identification of the equipment and the identification of the software. The identification number of the equipment is stored in an EEPROM, and can only be modified or deleted by the manufacturer. Because this identification number is stored in the equipment, the software is in principle device-dependent. The identification number of the software is stored with the rest of the software in an EPROM, and can likewise only be deleted or modified by the manufacturer.

The configuration telegram serves to configure the radar device. It can be transmitted at any desired moment through the use of full-duplex RS485 (RS422) communication. As soon as radar device 4 receives a configuration telegram, it stops transmitting object telegrams until the configuration telegram is processed and answered. The time lag between transmission of the configuration telegram and receipt of the reply telegram can amount to a full second, because the configuration data must be stored in the EEPROM, so that they also remain stored in the case of power failure.

However, when the angle correction factor—to be discussed below—is set to 0 in the configuration telegram, the configuration is not stored. Radar device 4 then sends the existing configuration as reply. In this case nothing has to be written to the EEPROM, and the time lag between configuration telegram and reply telegram amounts to less than 1 millisecond.

After sending a receipt telegram, radar device 4 returns once again to sending object telegrams.

The structure of the configuration telegram and the reply telegram is in principle identical. Only the lower byte of the first word, which indicates whether it is a configuration or a reply telegram, differs. The structure is as follows:

| Word number | Content |
|---|---|
| 1 | 7eh, 5bh for configuration and 81h, 5bh for reply telegram |
| 2 | Length (format: integer without sign) (here 8) |
| 3 | Lower limit $V_{min}$ of search field speed in cm/s (format: integer with sign) |
| 4 | Upper limit $V_{max}$ of search field speed in cm/s (format: integer with sign) |
| 5 | Lower limit $S_L$ of search field distance in cm (format: integer with sign) |
| 6 | Upper limit $S_U$ of search field distance in cm (format: integer with sign) |
| 7 | Threshold value distance for alarm in cm |
| 8 | Control alarm function |
| 9 | Angle correction factor for distance and speed |
| 10 | CRC |

The control word for the alarm function (word number 8) determines the operation of the alarm. Bit 0, the lowest bit, indicates the direction of the alarm relative to the critical value for the distance. If bit 0=0 this means that the alarm is activated when a vehicle V approaches and the distance decreases and eventually falls below the threshold value. This is the case when radar device 4, as seen in the travel direction, is placed beyond the point for monitoring 1 and irradiates the front side of the vehicle as shown in FIGS. 1 and 2. When bit 0=1 it is the case that the alarm is activated when the distance to vehicle V increases, and eventually exceeds the critical value. This is the case with a radar device 4 which, as seen in the travel direction, is placed before the point for monitoring as shown in FIG. 7, and is directed at the rear side of the passing vehicles. Once the alarm is activated, it remains active in both cases until the vehicle has left the search field S.

The lower and upper limit for the speed are $V_{min}$=0, respectively $V_{max}$=5800 (58 m/s, so 209 km/h) when vehicle V is approaching radar device 4 (bit 0=0), and $V_{min}$=−5800, respectively $V_{max}$=0 if vehicle V is driving away from radar device 4 (bit 0=1). The value of ±5800 applies only when the radar device is in line with the vehicle and the angle correction factor amounts to 1 (when word number 9 has the value 1000). In the case of measurements at an angle, this value is multiplied by the angle correction factor, which amounts to 1/cosγ, wherein γ is the above discussed solid angle between radar beam 5 and the speed vector of vehicle V. From the above stated relation for γ it follows that the angle correction factor amounts to $\sqrt{(b^2+d^2+h^2)}/d$.

The lower and upper limit for the distance amount to respectively $S_L$=0 and $S_U$=5000 (cm=50 m) for measurements straight from the front or the rear, while the maximum distance for measurements at an angle must be divided by the angle correction factor.

The alarm is finally activated only when two conditions are met simultaneously. In the first place the distance to the vehicle measured by radar device 4 must exceed the threshold value, which forms an indication that the vehicle is passing the stop line. In addition, the last ten measurements, thus the measurements during the last 100 milliseconds, of both the distance and the speed of vehicle V must mutually correspond within a determined bandwidth. As already stated above, the standard deviation σ can be used as criterion herefor, wherein for instance σ≦2.2 m could be used as limit values for the standard deviation in the distance measurements and σ1.4 m/s in the speed measurements. The measurements can therefore only meet the second requirement after 100 milliseconds, which entails that the search field S must be so large that a vehicle V at a normal speed cannot drive therethrough within 100 milliseconds.

The alarm is deactivated when vehicle V leaves search field S, or when for at least one measuring cycle (of 10 milliseconds) the second requirement is not met.

The system and the method as described above thus make it possible with simple means to establish when a vehicle passes a determined point on the road, such as a stop line, without operations on the road surface being necessary for this purpose. The method and the system are hereby highly suitable for application at busy traffic intersections. The detections are very reliable as a result of the checks applied thereto, and can also serve for law enforcement purposes.

Although the invention has been elucidated above on the basis of a number of exemplary embodiments, it will be apparent that it is not limited thereto. Within the scope of the following claims many variants and modifications can be envisaged which are deemed to fall within the scope of this application.

What is claimed is:

1. A method for monitoring a road and detecting the passage of a vehicle past a monitoring point, comprising:
   transmitting from a transmitting and receiving location remotely situated from said monitoring point at least one substantially continuous radar beam to the monitoring point;
   receiving reflections from the at least one transmitted radar beam at the transmitting and receiving location; and
   determining from the received reflections that the vehicle is passing the monitoring point by calculating from the received reflections a distance of the vehicle from the transmitting and receiving location and comparing the thus calculated distance to a known distance between the transmitting and receiving location and the monitoring point.

2. The method of claim 1, wherein at least one radar beam is transmitted at an acute angle to a travel direction of the passing vehicle.

3. The method of claim 2, wherein an activating signal is generated when a vehicle passes the monitoring point in a determined direction.

4. The method of claim 3, wherein the activating signal is linked with the identification of the transmitting and receiving location to form an object telegram.

5. The method of claim 3, wherein at least one picture record of the passing vehicle is made on the basis of the activating signal.

6. The method of claim 1, wherein a series of values for the distance of the vehicle is calculated from a number of successively received reflections, wherein the detection that the vehicle is passing the monitoring point is valid only if this series of distance values corresponds precisely.

7. The method of claim 6 wherein speed and travel direction of the passing vehicle is calculated from the received reflections.

8. The method of claim 7, wherein a series of values for the speed of the vehicle is calculated from a number of successively received reflections, and wherein the speed calculation is valid only when the series of speed values corresponds precisely.

9. The method of claim 7, wherein an activating signal is generated in response to the speed and travel direction calculation.

10. The method of claim 1, wherein the distance between the transmitting and receiving location and the monitoring point and a characteristic of the at least one transmitted radar beam are matched such that the dimension of the radar beam at the monitoring point is of the same order of magnitude as the width of a vehicle.

11. The method of claim 10, wherein the distance amounts to several tens of meters and the radar beam has a beam width of several degrees.

12. The method of claim 1, wherein the road comprises a number of lanes, on each of which a specific point is to be monitored, and for each lane a radar beam is transmitted at a related angle from the transmitting and receiving location.

13. A detection system for monitoring a road and detecting the passage of a vehicle by a monitoring point, comprising:
   a transmitting and receiving device disposed at a remote location from the monitoring point comprising:
   (1) a radar transmitter for transmitting at least one substantially continuous radar beam to the monitoring point,
   (2) a receiver for monitoring reflections from the at least one transmitted radar beam, and
   (3) a radar device for determining from the received reflections that a vehicle is passing the monitoring point, wherein the transmitting and receiving device is adapted to calculate from the received reflections a distance of the vehicle from the transmitting and receiving device and to compare the thus calculated distance to a known distance between the transmitting and receiving device and the monitoring point.

14. The detection system of claim 13, wherein the transmitting and receiving device is adapted to transmit the at least one radar beam at an acute angle in the horizontal plane to a travel direction of the passing vehicle.

15. The detection system of claim 13, wherein the transmitting and receiving device is adapted to calculate a series of values for the distance of the vehicle and to assume a detection that the vehicle is passing the monitoring point to be valid only if the series of distance values corresponds precisely.

16. The detection system of claim 13, wherein the transmitting and receiving device is adapted to generate an activating signal when a vehicle passes the monitoring point in a determined direction.

17. The detection system of claim 16, wherein the activating signal is generated in response to identification by the transmitting and receiving device of a passing vehicle.

18. The detection system of claim 16 wherein a device is connected to the transmitting and receiving device to make at least one picture record of the passing vehicle.

19. The detection system of claim 13, wherein the transmitting and receiving device is adapted to calculate from the received reflections speed and the travel direction of the passing vehicle.

20. The detection system of claim 19, wherein the transmitting and receiving device is adapted to calculate a series of values for the speed of the vehicle from a number of successively received reflections, and to determine that the calculated speed is valid only when the series of speed values corresponds precisely.

21. The detection system of claim 19, wherein the activating signal is generated in response to the calculated speed and travel directions.

22. The detection system of claim 13, wherein the transmitting and receiving device is disposed at a distance from the monitoring point and adapted to transmit a radar beam such that the dimension of the radar beam at the monitoring point is of the same order of magnitude as the width of a vehicle.

23. The detection system of claim 22, wherein the transmitting and receiving device is disposed at several tens of meters from the monitoring point and is adapted to transmit a radar beam with a beam width of several degrees.

24. The detection system of claim 13, wherein the road comprises a number of lanes, on each of which a specific point is to be monitored, and the transmitting and receiving device is adapted to transmit for each lane a radar beam at a related angle.

* * * * *